United States Patent [19]

Ivy et al.

[11] Patent Number: 4,523,403
[45] Date of Patent: Jun. 18, 1985

[54] FISHING DEVICE

[76] Inventors: Jim S. Ivy, 1135 Bates, SE., Grand Rapids, Mich. 49506; Willie C. Gray, 506 Storrs, SE., Grand Rapids, Mich. 49507

[21] Appl. No.: 581,616
[22] Filed: Feb. 21, 1984
[51] Int. Cl.³ .............................................. A01K 97/10
[52] U.S. Cl. .......................................... 43/17; 43/21.2
[58] Field of Search ............................ 43/17, 21.2, 16

[56] References Cited

U.S. PATENT DOCUMENTS 3,546,805 12/1970 Schaeffer ................................. 43/17
3,846,929 11/1974 McBride .................................. 43/17
4,133,131 1/1979 Davy ..................................... 43/21.2
4,240,221 12/1980 Komarnicki ............................ 43/17

Primary Examiner—Gene P. Crosby
Attorney, Agent, or Firm—Glenn B. Morse

[57] ABSTRACT

A foldable frame receives and supports fishing poles in the usual upwardly-inclined position. One detector on the frame responds to a force applied to any one of the poles, such as a pull on the line carried by the pole, and activates a bell signal accordingly. Other detectors respond to forces on individual poles, respectively, and activate light signals. The latter signals remain activated (after the force is no longer present) until reset.

6 Claims, 8 Drawing Figures

FIG. I

FISHING DEVICE

BACKGROUND OF THE INVENTION

Recreational fishing is such a leisurely activity that it tends to encourage the development of devices that permit the fisherman to practice this sport with a minimum of attention. Such equipment usually involves some form of support for the fishing pole, together with a signal system activated by a slight jerk on the fish line. In most cases the line is specially interengaged with the device. Ice fishing has generated the simplest form of these signal systems, which centers in a pivoted beam having a clip at one end for receiving the fish line, and a signal flag at the opposite end of the beam. A pull on the line simply rotates the beam and elevates the flag accordingly. In addition to these flag signals, some of the devices have made use of sound generators such as buzzers or bells, and lights have occasionally been used as well. Devices with electrical components have normally been battery-operated. Devices that have been based upon interengaging the line with some part of the mechanism tend to produce problems in retrieving the pole quickly enough to work the fish that has been caught. The present invention provides a simple foldable device along these general operating principles, and avoids many of the characteristics of previous devices that have tended to produce inconvenience in their use.

SUMMARY OF THE INVENTION

A foldable frame has a receptacle receiving the handle end of one or more fishing poles, and has structure that supports the poles in a upwardly-inclined position. A pull on the line associated with any one of the poles causes that pole to press against an actuator, and this activates a signal. A second actuator associated with the pole responds to the same forces, and activates another signal. Preferably, the first signal is acoustic; and the second, a light that remains energized to identify the pole that should be attended to. The lines are at all times free of interengagement with the device, so the poles remain instantly removable.

DESCRIPTION OF THE PREFERRED EMBODIMENT

Figure 1:
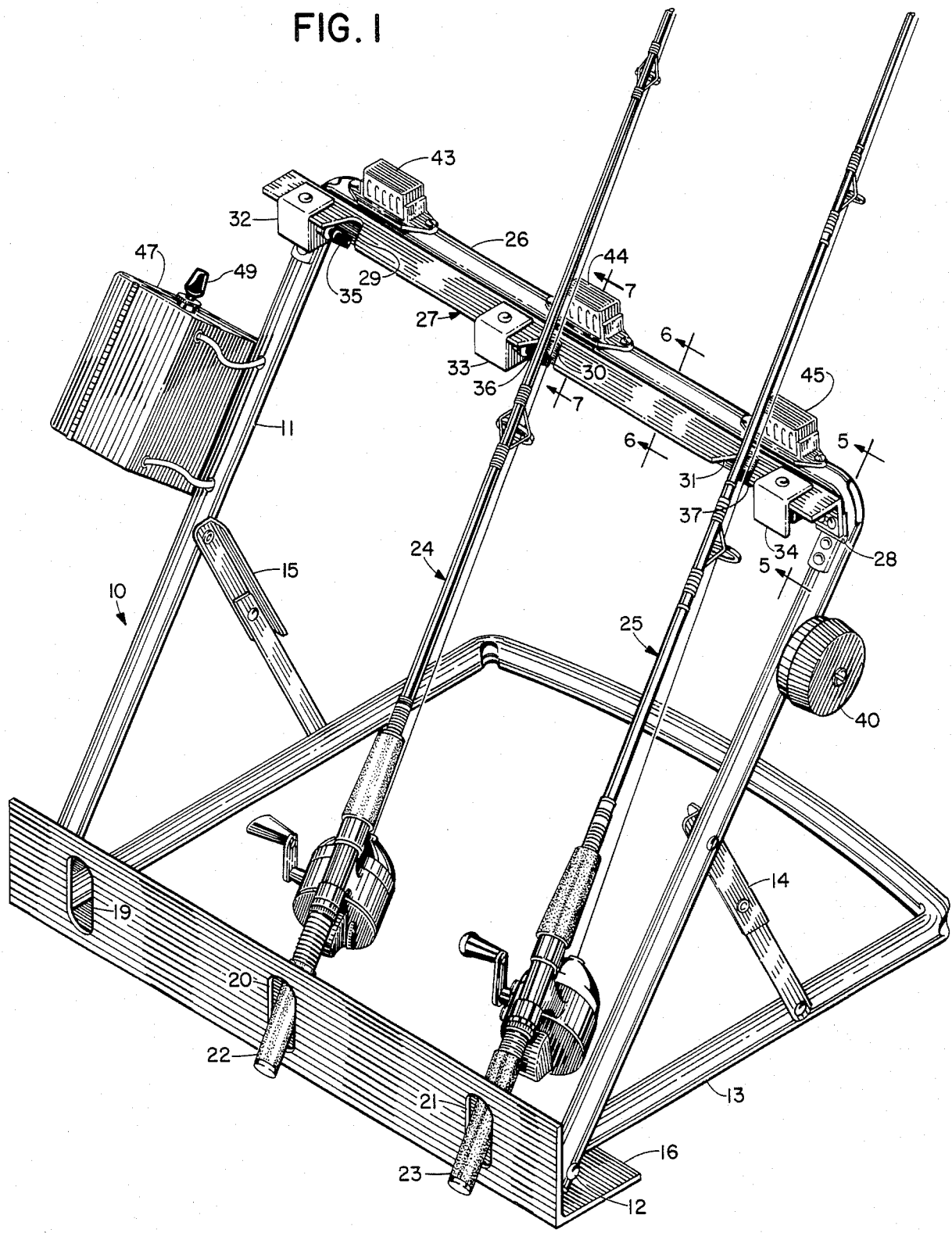
FIG. 1 is a perspective view of the unit in the operating position, showing two fishing poles installed.

The illustrated device has a frame generally indicated at 10 formed by the U-shaped member 11 pivotally connected as shown at 12 to the base 13, which is also of a U-shaped configuration. The members 11 and 13 are tubular, and are interconnected by the folding diagonal braces 14 and 15 that maintain the position of the device shown in FIG. 1. The frame also includes the relatively heavy angle iron piece 16, which is fixed with respect to the base 13 by convenient fastenings as shown at 17 and 18 in FIG. 2. The relatively heavy angle iron piece 16 tends to stabilize the device, and has a group of elongated holes 19-21 which form receptacles for the handles shown at 22 and 23 of the fishing poles 24 and 25. With the device sitting on the ground, the penetration of the handles 22 and 23 through the openings 20 and 21 is limited to about the position illustrated.

Figure 3:
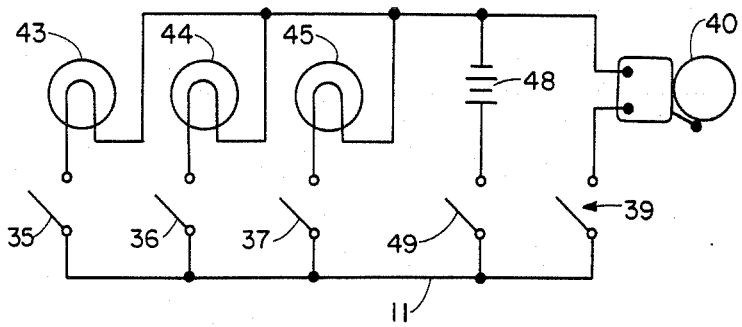
FIG. 3 is a circuit diagram showing the relationship of the electrical components of the device.
Figure 4:
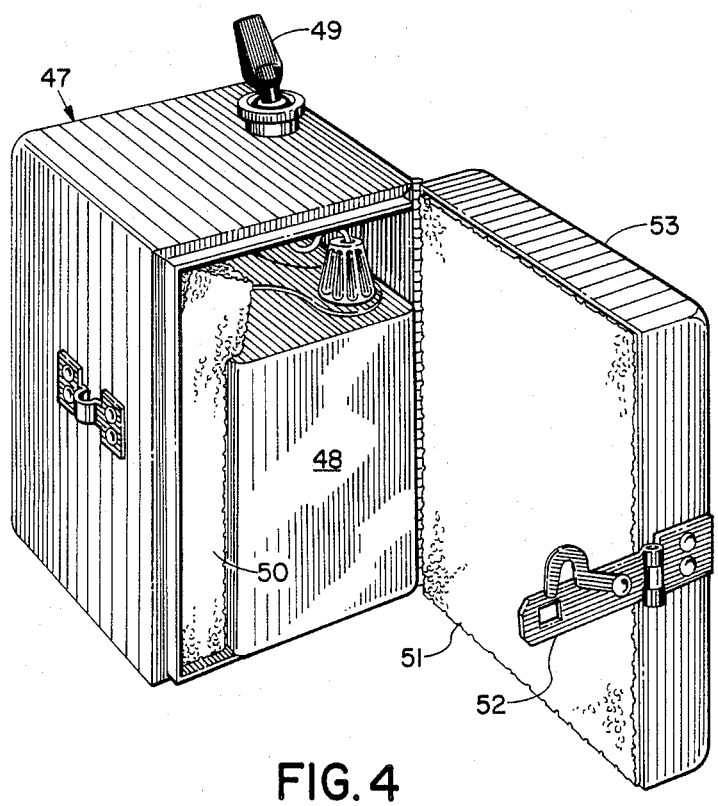
FIG. 4 is a view of the battery-storage box, shown in the open position.
Figure 5:
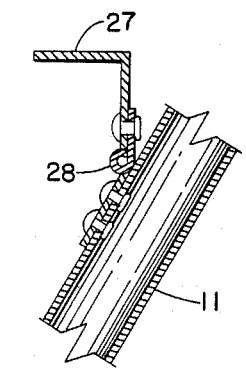
FIG. 5 is a sectional view on the plane 5—5 of FIG. 1.
Figure 6:
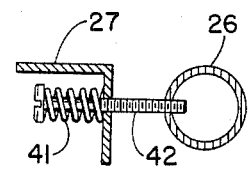
FIG. 6 is a section on the plane 6—6 of FIG. 1.
Figure 8:
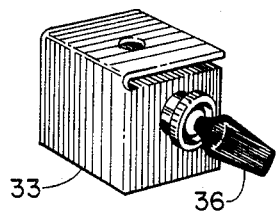
FIG. 8 is a perspective view showing one of the standard switches associated with each of the poles, and its supporting bracket.
Figure 7:
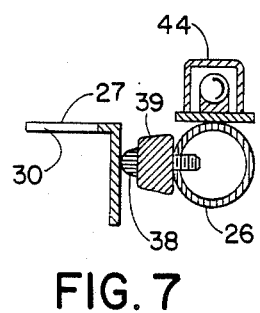
FIG. 7 is a section on the plane 7—7 of FIG. 1.

At the upper end of the structure, the transverse portion of the frame member 11 is indicated at 26, and forms a beam supporting many of the active components of the device. A bar 27 is angular in cross-section, and is hinged at its opposite ends as shown at 28 in FIG. 1 to the inclined legs of the U-shaped member 11. The bar 27 has locating notches 29-31 for positioning fishing poles laterally, and the brackets 32-34 secured to the bar 27 carry standard switches in a position such that their actuators 35-37 are in position to be operated by pressure from the fishing poles located by the notches. In the "ready" position, the poles are leaning against these actuators. Forces against the actuators are thus carried by the bar 27, and these forces are in the direction to rotate the bar about the hinges 28. Such rotation operates the actuator 38 of the switch 39 mounted on the beam 26. Electric wires (mostly not shown) associate the switch 39 with the electrically-operated bell 40. After a jerk on the fish line associated with either of the poles has induced the rotation of the bar 27, and operated the bell 40, the bar is returned to inactive position by the spring normally associated with the actuator 38 of the switch 39. A spring 41 (referring to FIG. 6) contributes a biasing action tending to hold the bar in a position bearing lightly on the actuator 38 to remove any lost motion from the system. The spring 41 is positioned by a bolt 42 freely traversing the bar 27, and engaging the beam 26. The standard switches carried by the brackets 32-34 are of a type that remain in the actuated position until manually reset. These switches are respectively associated with the lights 43-45 secured to the beam 26, preferably by sheet-metal screws as shown in FIG. 1. A box 47 is also preferably attached to the frame member 11 by sheetmetal screws (not shown) from the inside of the box. Referring to FIG. 4, this box contains the battery 48 providing energy for the electrical components. The circuit relationship of these components is illustrated in FIG. 3. An off-on switch (not shown) is mounted inside the box 47, and has the exterior actuator 49 with which the device can be placed in either active or inactive condition. The battery 48 within the box 47 is padded by the presence of open-cell sponge material as indicated at 50 and 51, which tends to absorb any water that might be present in the neighborhood of the battery. Normally, the latch 52 maintains the hinged cover 53 of the box 47 in the fully closed position. Most of the wiring associated with the lights, the bell, and the various switches can be carried inside the tubular frame member 11, with the member itself forming the ground side of the circuit.

Figure 2:
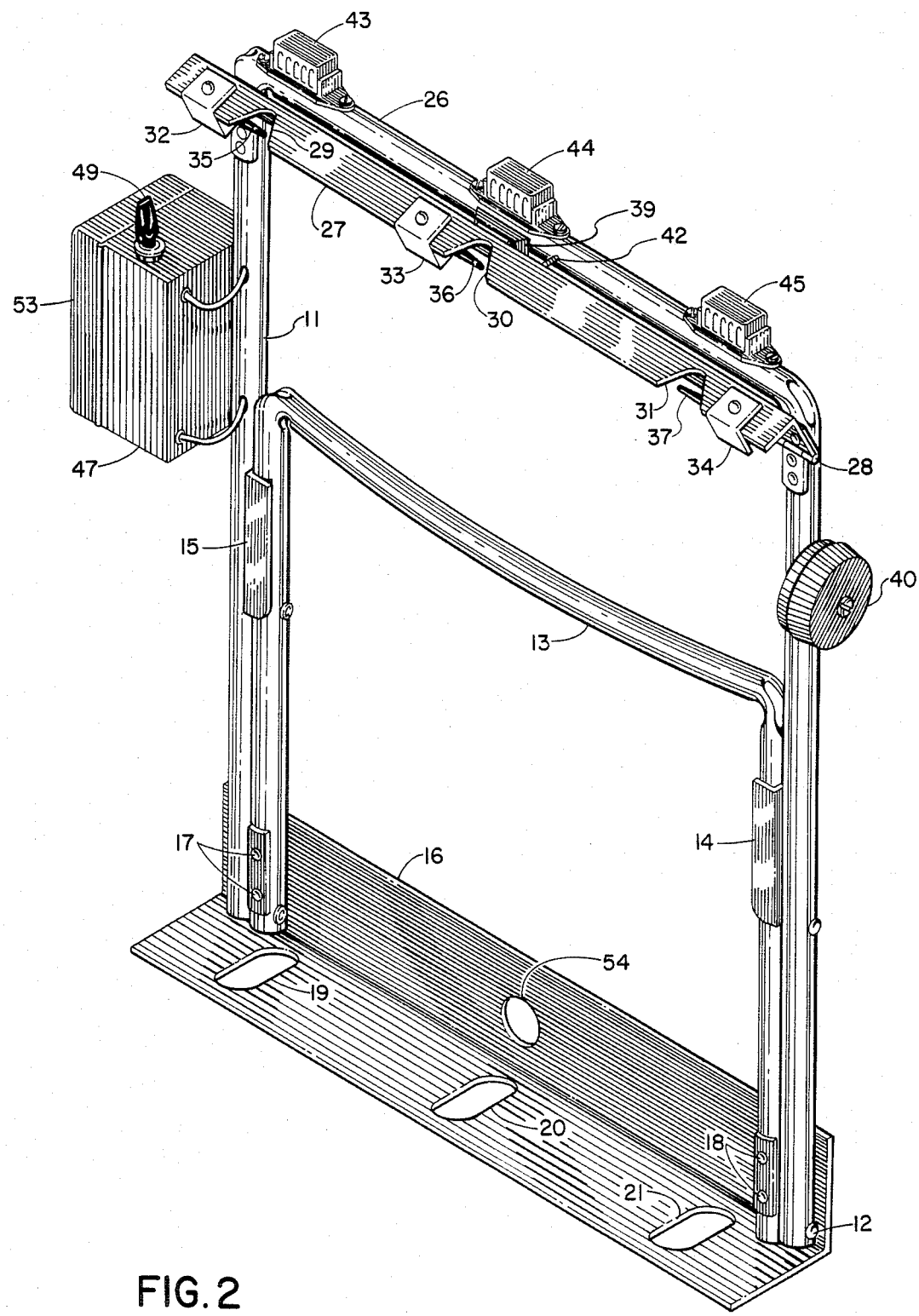
FIG. 2 shows the device in the folded position, ready for storage.

In the folded position shown in FIG. 2, the device is easily carried in the trunk of an automobile, or in any other convenient position of storage. If desired, an opening as shown at 54 in the horizontal leg of the member 16 can be provided for receiving a stake to anchor the unit in the erect position shown in FIG. 1.

We claim:

1. A fisherman's signalling device, comprising:

a frame having a receptacle for receiving the butt of at least one fishing pole, and also having a base and a beam providing a support for a fishing pole engaging said receptacle and inclined upwardly therefrom;

an actuating bar moveably mounted on said frame;

first switch means, said first switch means being mounted on said frame, and having an operating member disposed for actuation by said bar;

first signal means mounted on said frame, and adapted to be energized by said first switch means;

second switch means, said second switch means having an operating member and being mounted on one of said beam and said bar;

locating means fixed with respect to one of said beam and said bar, and adapted to position a fishing pole on said second switch means operating member;

second signal means mounted on said frame, and adapted to be energized by said second switch means; and electrical circuit means providing energy for said signal means.

2. A device as defined in claim 1, wherein said actuating bar is pivotally mounted parrallel to said beam.

3. A device as defined in claim 1, wherein said locating means is a notch in said bar.

4. A device as defined in claim 1, wherein said first signal means is a sound producer, and said second signal means is a light, said second switch means being adapted to remain closed after actuation.

5. A device as defined in claim 1, wherein said second switch means is mounted on said bar.

6. A device as defined in claim 1, wherein said beam is the central portion of a U-shaped member pivoted to said base adjacent said receptacle.

* * * * *